(12) United States Patent
Lim

(10) Patent No.: US 6,728,229 B1
(45) Date of Patent: Apr. 27, 2004

(54) CELL SEARCH APPARATUS AND METHOD IN ASYNCHRONOUS COMMUNICATION SYSTEM

(75) Inventor: Chae-Man Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/560,732

(22) Filed: Apr. 28, 2000

(30) Foreign Application Priority Data

Apr. 28, 1999 (KR) .......................................... 1999-15224

(51) Int. Cl.[7] .............................................. H04B 7/005
(52) U.S. Cl. ...................... 370/335; 370/342; 375/142; 375/145; 375/149
(58) Field of Search ................................. 370/310, 320, 370/321, 324, 328, 335, 337, 338, 342, 347, 350, 458, 503, 509; 375/130, 137, 140, 142, 145, 149; 455/422.1, 446, 464, 435.1

(56) References Cited

U.S. PATENT DOCUMENTS

| | | | |
|---|---|---|---|
| 5,930,366 A | * | 7/1999 | Jamal et al. ................ 370/509 |
| 6,185,244 B1 | * | 2/2001 | Nystrom et al. ............ 375/145 |
| 6,226,315 B1 | * | 5/2001 | Sriram et al. ............... 375/140 |
| 6,233,271 B1 | * | 5/2001 | Jones et al. ................. 375/142 |
| 6,345,069 B1 | * | 2/2002 | Dabak et al. ............... 375/152 |
| 6,363,060 B1 | * | 3/2002 | Sarkar ........................ 370/342 |
| 6,504,830 B1 | * | 1/2003 | Ostberg et al. ............ 370/342 |
| 6,526,091 B1 | * | 2/2003 | Nystrom et al. ............ 375/142 |

* cited by examiner

*Primary Examiner*—Hassan Kizou
*Assistant Examiner*—M. I. McLoughlin
(74) *Attorney, Agent, or Firm*—Dilworth & Barrese LLP

(57) ABSTRACT

A cell searching apparatus and method in a mobile communication system. In the cell searching method, a base station group specific code is determined from a synchronization channel signal in synchronization with slot time. Then, the predetermined base station group specific symbol cyclically reads a base station group specific code table. A code with a minimum distance estimation value with respect to a base station group specific code read from the base station group specific code table is chosen as a final base station group specific code.

10 Claims, 5 Drawing Sheets

| s(1,1) | s(1,2) | ... | s(1,15) | s(1,16) |
|---|---|---|---|---|
| s(2,1) | s(2,2) | ... | s(2,15) | s(2,16) |
| ⋮ | ⋮ | ⋮ | ⋮ | ⋮ |
| s(16,1) | s(16,2) | ... | s(16,15) | s(16,16) |
| s(17,1) | s(17,2) | ... | s(17,15) | s(17,16) |

← Cyclic shift

FIG.3A
(PRIOR ART)

| s(1,2) | s(1,3) | ... | s(1,16) | s(1,1) |
|---|---|---|---|---|
| s(2,2) | s(2,3) | ... | s(2,16) | s(2,1) |
| ⋮ | ⋮ | ⋮ | ⋮ | ⋮ |
| s(16,2) | s(16,3) | ... | s(16,16) | s(16,1) |
| s(17,2) | s(17,3) | ... | s(17,16) | s(17,1) |

← Cyclic shift

FIG.3B
(PRIOR ART)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 2 | 11 | 6 | 3 | 15 | 7 | 8 | 8 | 7 | 15 | 3 | 6 | 11 | 2 |
| 2 | 1 | 2 | 9 | 3 | 10 | 11 | 13 | 13 | 11 | 10 | 3 | 9 | 2 | 1 | 16 | 16 |
| 3 | 1 | 3 | 16 | 12 | 14 | 2 | 11 | 2 | 17 | 12 | 16 | 3 | 1 | 13 | 4 | 13 |
| 4 | 1 | 4 | 6 | 4 | 1 | 10 | 9 | 8 | 17 | 14 | 12 | 14 | 17 | 8 | 9 | 10 |
| 5 | 1 | 5 | 13 | 13 | 5 | 1 | 7 | 14 | 3 | 16 | 8 | 8 | 16 | 3 | 14 | 7 |
| 6 | 1 | 6 | 3 | 5 | 9 | 9 | 8 | 3 | 6 | 1 | 4 | 2 | 15 | 15 | 2 | 4 |
| 7 | 1 | 7 | 10 | 14 | 13 | 17 | 3 | 9 | 9 | 3 | 17 | 13 | 14 | 10 | 7 | 1 |
| 8 | 1 | 8 | 17 | 6 | 17 | 8 | 1 | 15 | 12 | 5 | 13 | 7 | 13 | 5 | 12 | 15 |
| 9 | 1 | 9 | 7 | 15 | 4 | 16 | 16 | 4 | 15 | 7 | 9 | 1 | 12 | 17 | 17 | 12 |
| 10 | 1 | 10 | 14 | 7 | 8 | 7 | 14 | 10 | 1 | 9 | 5 | 12 | 11 | 12 | 5 | 9 |
| 11 | 1 | 11 | 4 | 16 | 12 | 15 | 12 | 16 | 4 | 11 | 1 | 6 | 10 | 7 | 10 | 6 |
| 12 | 1 | 12 | 11 | 8 | 16 | 6 | 10 | 5 | 7 | 13 | 14 | 17 | 9 | 2 | 15 | 3 |
| 13 | 1 | 13 | 1 | 17 | 3 | 14 | 8 | 11 | 10 | 15 | 10 | 11 | 8 | 14 | 3 | 17 |
| 14 | 1 | 14 | 8 | 9 | 7 | 5 | 6 | 17 | 13 | 17 | 6 | 5 | 7 | 9 | 8 | 14 |
| 15 | 1 | 15 | 15 | 1 | 11 | 13 | 4 | 6 | 16 | 2 | 2 | 16 | 6 | 4 | 13 | 11 |
| 16 | 1 | 16 | 5 | 10 | 15 | 4 | 2 | 12 | 2 | 4 | 15 | 10 | 5 | 16 | 1 | 8 |
| 17 | 1 | 17 | 12 | 2 | 2 | 12 | 17 | 1 | 5 | 6 | 11 | 4 | 4 | 11 | 6 | 5 |
| 18 | 2 | 8 | 11 | 15 | 14 | 1 | 4 | 10 | 10 | 4 | 1 | 14 | 15 | 11 | 8 | 2 |
| 19 | 2 | 9 | 1 | 7 | 1 | 9 | 2 | 16 | 13 | 6 | 14 | 8 | 14 | 6 | 13 | 16 |
| 20 | 2 | 10 | 8 | 16 | 5 | 17 | 17 | 5 | 16 | 8 | 10 | 2 | 13 | 1 | 1 | 13 |
| 21 | 2 | 11 | 15 | 8 | 9 | 8 | 15 | 11 | 2 | 10 | 6 | 13 | 12 | 13 | 6 | 10 |
| 22 | 2 | 12 | 5 | 17 | 13 | 16 | 13 | 17 | 5 | 12 | 2 | 7 | 11 | 8 | 11 | 7 |
| 23 | 2 | 13 | 12 | 9 | 17 | 7 | 11 | 6 | 8 | 14 | 15 | 1 | 10 | 3 | 16 | 4 |
| 24 | 2 | 14 | 2 | 1 | 4 | 15 | 9 | 12 | 11 | 16 | 11 | 12 | 9 | 15 | 4 | 1 |
| 25 | 2 | 15 | 9 | 10 | 8 | 6 | 7 | 1 | 14 | 1 | 7 | 6 | 8 | 10 | 9 | 15 |
| 26 | 2 | 16 | 16 | 2 | 12 | 14 | 5 | 7 | 17 | 3 | 3 | 17 | 7 | 5 | 14 | 12 |
| 27 | 2 | 17 | 6 | 11 | 16 | 5 | 3 | 13 | 3 | 5 | 16 | 11 | 6 | 17 | 2 | 9 |
| 28 | 2 | 1 | 13 | 3 | 3 | 13 | 1 | 2 | 6 | 7 | 12 | 5 | 5 | 12 | 7 | 6 |
| 29 | 2 | 2 | 3 | 12 | 7 | 4 | 16 | 8 | 9 | 9 | 8 | 16 | 4 | 7 | 12 | 3 |
| 30 | 2 | 3 | 10 | 4 | 11 | 12 | 14 | 14 | 12 | 11 | 4 | 10 | 3 | 2 | 17 | 17 |
| 31 | 2 | 4 | 17 | 15 | 15 | 3 | 12 | 3 | 15 | 13 | 17 | 4 | 2 | 14 | 5 | 14 |
| 32 | 2 | 5 | 7 | 5 | 2 | 11 | 10 | 9 | 1 | 15 | 13 | 15 | 1 | 9 | 10 | 1 |

FIG.4
(PRIOR ART)

CELL SEARCH APPARATUS AND METHOD IN ASYNCHRONOUS COMMUNICATION SYSTEM

BACKGROUND OF THE INVENTION

1. Field of the Invention

The present invention relates generally to a mobile communication system, and in particular, to an apparatus and method for searching for a cell between an asynchronous base station (BS) and a mobile station (MS).

2. Description of the Related Art

The UMTS (Universal Mobile Telecommunication System) is an asynchronous base station system in which each constituent BS is assigned to a unique cell specific code for identification. For example, if the UMTS includes 512 cells, i.e., 512 BSs, 512 cell specific codes are assigned to the respective 512 BSs. To reduce calculations for cell search in an MS, the BSs in the UMTS are divided into a predetermined number of groups (e.g., 32 groups), each BS group being assigned to a different group specific code. The MS first detects a BS group that a serving BS belongs to by searching for the specific code of the BS group and then determines the serving BS in the BS group. This multi-step cell search algorithm includes the steps of (1) receiving a primary synchronization channel (P-SCH) signal from a serving BS and synchronizing to the slot time of a slot received with the highest power; (2) receiving a secondary synchronization channel (S-SCH) signal from the BS while the MS is synchronized with the slot time and detecting frame synchronization and the group specific code of the BS; and (3) receiving a broadcasting channel (BCH) signal from the BS based on the frame synchronization and the BS group specific code and searching for the cell specific code of the BS.

FIG. 1 illustrates the structure of UMTS channels. Referring to FIG. 1, one UMTS channel frame includes 16 slots and each slot has 2560 chips. Therefore, one frame has 40,960 chips ($T_{frame}$=16 Tslots). A BS transmits a synchronization code #0, SC 0, to an MS on a P-SCH for a tenth of the each slot period, that is, for 256 chips. Then, the MS receives the P-SCH signal $C_p$ and synchronizes with the BS slot time (the first cell search step). All BSs of the UMTS transmit the same synchronization code to the MS on P-SCHs. The MS synchronizes its timing with the slot time of the serving BS based on the offsets of the P-SCH signals. Then, for the "$i^{th}$" BS group the BS maps its BS group specific code $C_s^{i,1}$–$C_s^{i,16}$ on an S-SCH, and the slot-time synchronized MS acquires the BS group specific code and frame synchronization of the serving BS from the received S-SCH signal. The BS specific code is set in accordance with a comma free code produced by selectively combining 16 codes from the 17 synchronization codes SC 1–SC 17 available (the second cell search step).

The second cell search step will be described in detail with reference to FIG. 2. To do convenient explanation of decision variable calculation procedure, it is assumed that the correlation result array of one frame is s[17][16] (the correlation accumulator 217), the decision variable array is Y[32][16] (the correlation accumulator 223), and comma free code table array is C[32][16] (comma free code table 221).

FIG. 2 is a block diagram of a conventional cell search apparatus. The following description is conducted on the assumption that a serving BS is in a first BS group. Referring to FIG. 2, the BS maps synchronization codes corresponding to its BS group specific code on an S-SCH signal. The MS, synchronized with the slot time of the BS according to a slot time synchronization index detected in the first cell search step, receives the S-SCH signal at an S-SCH correlation unit 211 in the cell search apparatus. The S-SCH correlation unit 211 is comprised of $1^{st}$ to $17^{th}$ S-SCH correlators 213 to 215 for computing correlation values of the received S-SCH signal by $1^{st}$ to $17^{th}$ synchronization code auto-correlation functions. The S-SCH correlation unit 211 has as many correlators as the synchronization codes, that is, 17 correlators for detecting correlation values of each slot in an input frame with respect to the respective synchronization codes. Upon detection of a first slot of the input frame, the S-SCH correlation unit 211 computes correlation values of the S-SCH channel in the first slot with respect to the respective synchronization codes. Since 17 correlation values are computed for one slot with respect to the $1^{st}$ to $17^{th}$ synchronization codes, a matrix of 16×17 correlation values are obtained for one frame. An S-SCH correlation value storage 217 stores the correlation values received from the S-SCH correlation unit 211 in the form of a 16×17 matrix, as shown in FIG. 3A. The correlation values of the SCH in each slot of the input frame are stored column by column. That is, correlation values of the S-SCH in the first slot are arranged in a first column, s(1, 1), s(2, 1), . . . , s(16, 1), s(17, 1). Correlation values of the S-SCH in the second slot are arranged in a second column, s(1, 2), s(2, 2), . . . , s(16, 2), s(17, 2). Finally, correlation values of the S-SCH in the 16th slot are arranged in a sixteenth column s(1, 16), s(2, 16), . . . , s(16, 16), s(17, 16).

When the 16×17 correlation values are completely stored in the S-SCH correlation value storage 217 at the end of the input frame, a shift comparator 219 reads a comma free code table as shown in FIG. 4 from a comma free code table storage 221. The shift comparator 219 compares the S-SCH correlation values received from the S-SCH correlation value storage 217 with comma free codes in the comma free code table and feeds the resulting mapped correlation values to a correlation value accumulator 223. The shift comparator 219 refers to the comma free code table for the initial S-SCH correlation value s(1, 1) shown in FIG. 3A. FIG. 4 shows that a first codeword in the comma free code table has 1 as its first symbol, which implies that the BS mapped a synchronization code corresponding to symbol 1, that is, the first synchronization code SC 1 on the S-SCH prior to transmission. Hence, the correlation value accumulator 223 stores s(1,1) in Y(1,1). As the same manner, the other correlation values mapped to the other symbols of first codeword inserted in the other slot are sequentially accumulated in Y(1,1), too. The same procedures are performed to the other codeword. So, the accumulated values of 0 cyclic shift version are stored in the first row of 32×16 decision variable memory Y(correlation value accumulator 223). While the shift comparator 219 cyclically shift S-SCH correlation values 15 times as shown in FIG. 3B, the procedure is described in the top is performed. The correlation accumulator 223 accumulatively stores 32×16 decision variables. If do the detailed description of calculation of the decision variable (Y[32][16]), the Calculation algorithm is carried out in the following way:

for(i=0; i<32; i++)

for(j=0; j<16; j++){Y[i][j]=0; for(k=0; k<16; k++)Y[i][j]+=s[C[i][(k+j)%16]][k];}, These calculations are performed with the purpose of summation of correlation results in various combinations (32×16=512). Within the correlation value accumulator 223, a maximum correlation value detector 225 searches for the maximum value (i, j) whose first index i corresponds to BS group specific code and the second index j determines frame synchronization, i.e. the beginning of next frame in (16−j) %16 slots. Therefore, the MS detects an offset to thereby acquire frame synchronization to the BS and find out the BS group.

For detection of frame synchronization and a BS group in the above second cell search step, the conventional cell search apparatus is required to have a memory capable of storing the 16×17 correlation values for the 16 slots of one frame in the S-SCH correlation unit 211 and a memory capable of storing the 32×16×16 correlation values resulting from the shift comparison in the correlation value accumulator 223.

SUMMARY OF THE INVENTION

It is, therefore, an object of the present invention to provide a cell search apparatus and method which can minimize in the second cell search step of frame synchronization and a BS group.

It is another object of the present invention to provide a cell search apparatus and method which can increase the resource use efficiency of memories in the second cell search step of frame synchronization and a BS group.

To achieve the above objects, there is provided a cell search apparatus and method in a mobile communication system. In the cell search apparatus, a base station group specific code predetermining unit determines a base station group specific code beforehand from a synchronization channel in synchronization with slot time. An operation unit cyclically shift-operates the predetermined base station group specific code of a base station group specific code table. A base station group specific code detecting unit determines a code having a minimum distance estimation value with respect to a base station group specific code from the base station group specific code table among the results of the cyclic-shift operation as a final base station group specific code.

In the cell searching method, a base station group specific code is determined beforehand from a synchronization channel in synchronization with slot time. Then, referring to a base station group specific code table, the predetermined base station group specific code is cyclic-shifted operated. A code with a minimum distance estimation value with respect to a base station group specific code on the base station group specific code table among the results of the cyclic-shift operation is determined as a final base station group specific code.

BRIEF DESCRIPTION OF THE DRAWINGS

The above and other objects, features and advantages of the present invention will become more apparent from the following detailed description when taken in conjunction with the accompanying drawings in which:

FIG. 3A is an S-SCH correlation value table;

FIG. 3B is another S-SCH correlation value table resulting from cyclically shifting the S-SCH correlation values in the table of FIG. 3A;

FIG. 4 is a comma free code table; and

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
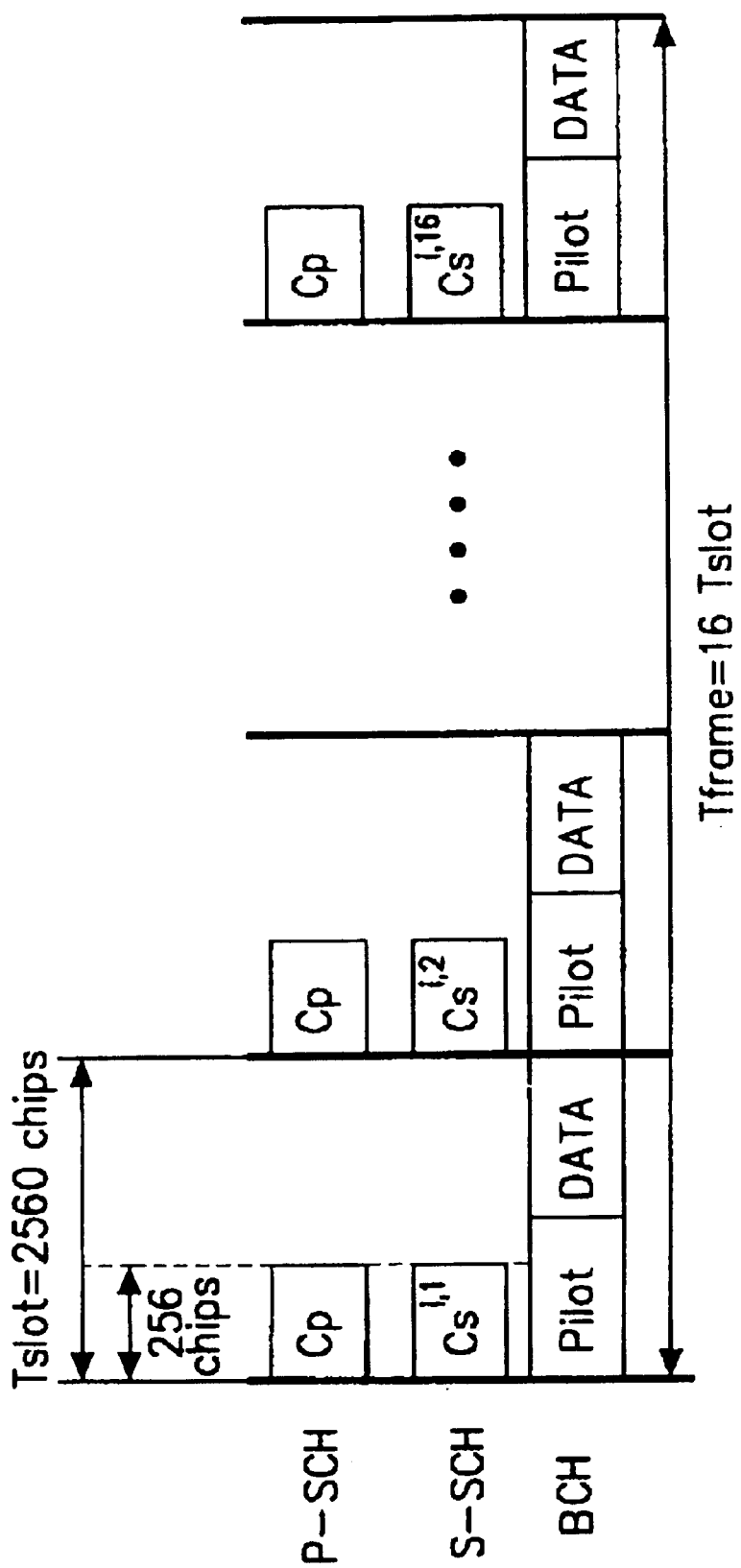
FIG. 1 illustrates a typical UMTS channel structure.
Figure 2:
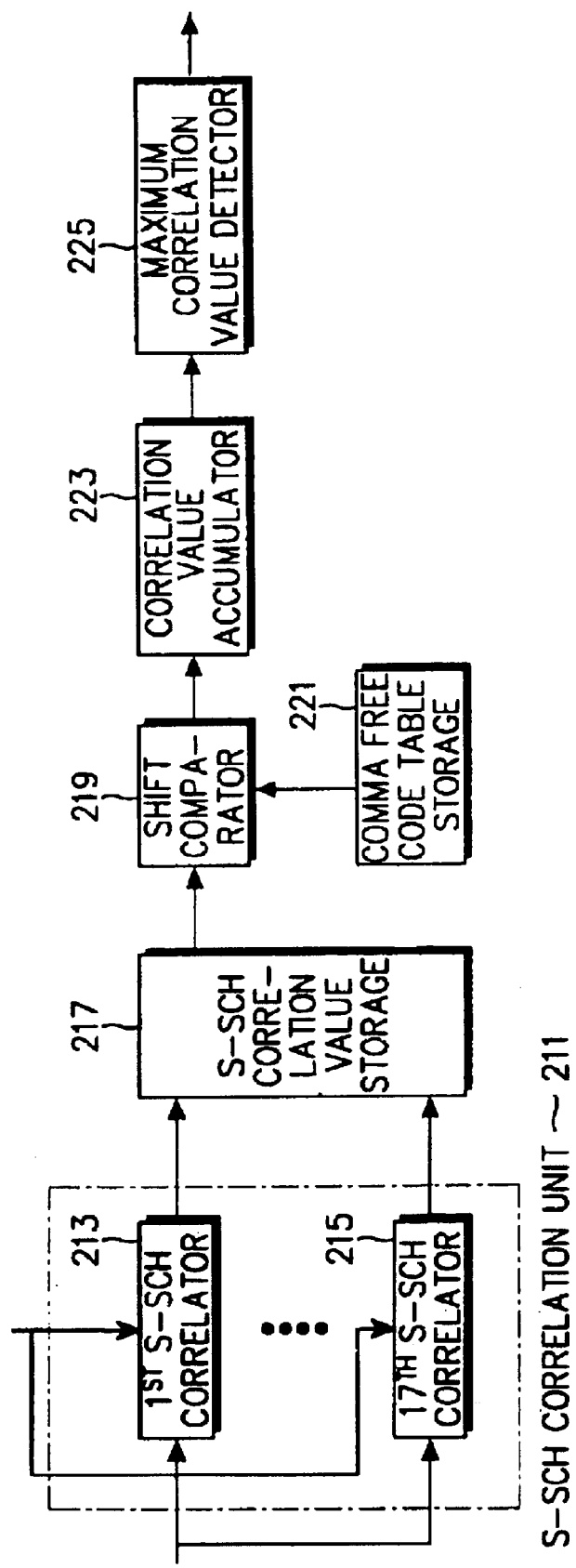
FIG. 2 is a block diagram of a conventional cell search apparatus.
Figure 5:
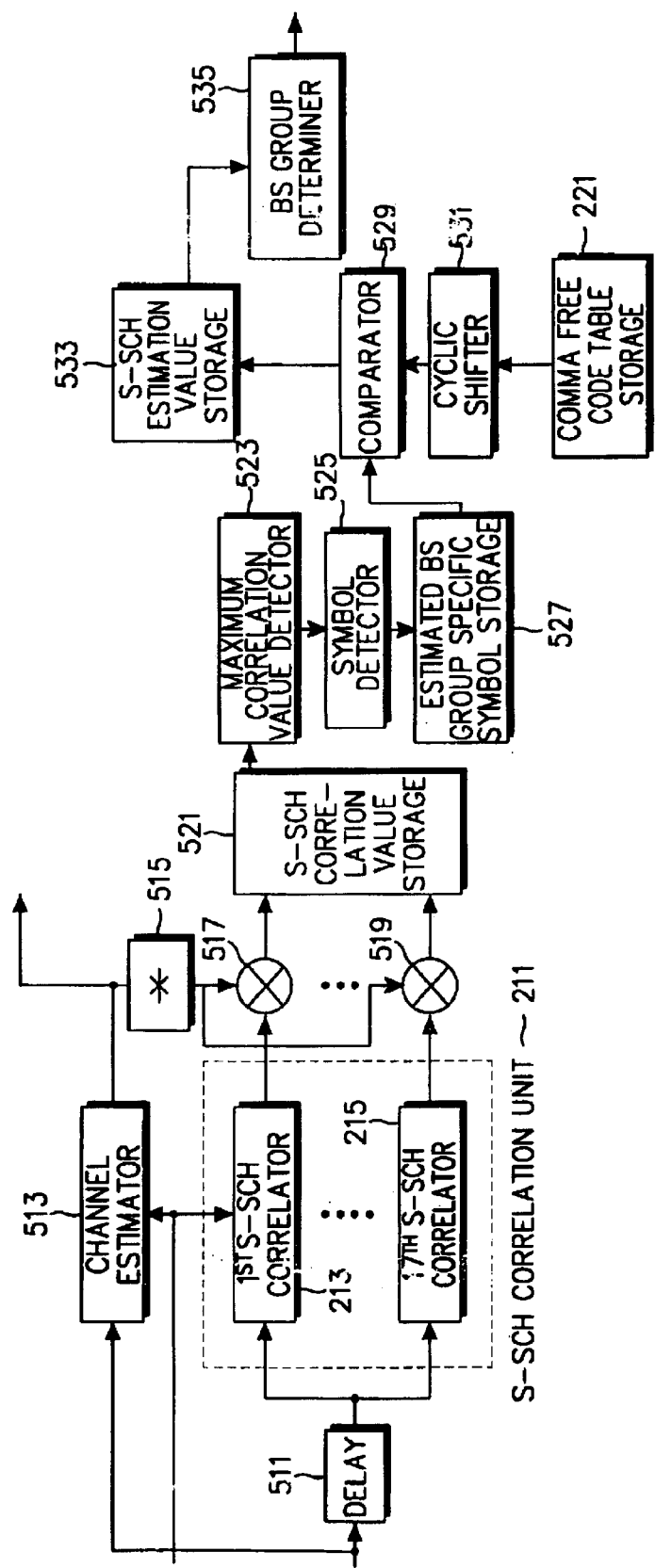
FIG. 5 is a block diagram of a cell search apparatus according to an embodiment of the present invention.

FIG. 5 is a block diagram of a cell search apparatus according to an embodiment of the present invention.

Referring to FIG. 5, the cell search apparatus is comprised of a BS group specific code predetermining unit for predetermining a BS group specific code on an SCH which provides slot time synchronization to the cell search apparatus, an operation unit for performing a cyclic-shift operation on the predetermined BS group specific code referring to a BS group specific code table, and a BS specific code detecting unit for detecting a BS group specific code with a minimum estimated distance. The BS group specific code predetermining unit includes a delay 511, a channel estimator 513, a conjugator 515, the S-SCH correlation unit 211, mixers 517 to 519, an S-SCH correlation value storage 521, a 5 maximum correlation value detector 523, a symbol detector 525, and an estimated BS Group specific symbol storage 527. The operation unit includes the comma free code table storage 221, a cyclic shifter 531, and a comparator 529. The BS group specific code detecting unit includes an S-SCH estimation storage 533 and a BS group determiner 535.

Upon receipt of a slot-time synchronizing slot time index after the first cell search step as stated before, the channel estimator 513 and the S-SCH correlation unit 211 are activated in synchronization to the time slot. The channel estimator 513 estimates an S-SCH using a P-SCH signal and feeds a channel estimated value to the conjugator 515. Assuming that the received P-SCH signal is $(r_1+jar_Q)$, this signal is input to the channel estimator 513 where, $r_1$ is a in-phase component of received signal and $r_Q$ is Quadrature component of received signal. Then, the channel estimator 513 despreads the input signal using a first synchronization code SCH0 of the P-SCH and performs channel compensation of the S-SCH using this despreaded signal. The channel compensation can be expressed.

$$\sum_{n=0}^{255} ((r_1(n) + jr_Q(n)) * SCH0(n) * (1-1j)) \quad (1)$$

The channel estimator 513 applies the channel estimation signal to the conjugator 515. The channel estimation is implemented to prevent performance decrease possibly caused by an error involved in predetermining a BS group specific code. The conjugator 515 obtains the conjugate of the received signal.

Meanwhile, the channel estimator 513 and the S-SCH correlation unit 211 are provided slot timing signal of P-SCH. To compensate for a time delay that occurred for the channel estimation, the delay 511 delays the received signal to control the output timing of the S-SCH correlation unit 211 by with the output of the channel estimator 513. The duration of the delay time is 256 chip (1 symbol). So, the channel estimator has to complete the calculation of channel estimation during this time. The S-SCH correlation unit 211 calculate correlation values of the signal received from the delay 511 with respect to the $1^{st}$ to $17^{th}$ synchronization codes SC1 to SC17, in response to the signal received from the timing signal. The S-SCH correlation unit 211 is comprised of the $1^{st}$ to $17^{th}$ S-SCH correlators 213 to 215 for computing correlation values of the received S-SCH signal by the $1^{st}$ to $17^{th}$ synchronization code auto-correlation functions. The S-SCH correlation unit 211 has as many correlators as the synchronization codes, that is, 17 correlators for detecting correlation values of each slot in an input frame with respect to the respective synchronization codes.

The reason to provide the 17 S-SCH correlators is the structure of the S-SCH. The structure of the S-SCH will be described in connection with the comma free code table of FIG. 4. The comma free codes are BS group specific codes, setting synchronization codes of the S-SCH. Since a cyclic shift value of each codeword is set in the comma free codes, this makes it possible to detect BS frame synchronization and a BS group specific code. A comma free code includes 16 symbols, each symbol indicating a synchronization code number. For example, if symbol data is 6, a $6^{th}$ synchronization code is mapped on the S-SCH. Referring to the comma free code table, a first BS group specific code is "1, 1, 2, 11, 6, 3, 15, 7, 8, 8, 7, 15, 3, 6, 11, 2". A BS having this group code maps the symbols of a comma free code indicating its BS group specific code in the slots of an S-SCH frame, one to one.

The one-to-one mapping of the symbols of a comma free code to the slots of an S-SCH frame will be described. If a BS belongs to a first BS group, its BS group specific code is "1, 1, 2, 11, 6, 3, 15, 7, 8, 8, 7, 15, 3, 6, 11, 2" and the BS maps synchronization codes according to the BS group specific code on the 16 slots of a S-SCH signal frame, that is, SC1 in slot #1, SC1 in slot #2, SC2 in slot #3, SC11 in slot #4, SC6 in slot #5, SC3 in slot #6, SC15 in slot #7, SC7 in slot #8, SC8 in slot #9, SC8 in slot #10, SC7 in slot #11, SC15 in slot #12, SC3 in slot #13, SC6 in slot #14, SC11 in slot #15, and SC2 in slot #16.

Because a comma free code formed by combining 16 codes selected from the 17 available synchronization codes is mapped in the slots of the S-SCH signal frame, the S-SCH correlation unit 211 is provided with as many correlators as the synchronization codes to compute a correlation value with respect to each synchronization code. Since 17 correlation values are detected for one slot with respect to the $1^{st}$ to $17^{th}$ synchronization codes, 16×17 correlation values are obtained for one frame. The first mixer 517 receives a correlation value from the $1^{st}$ S-SCH correlator 213 and the seventeenth mixer 519 receives a correlation value from the $17^{th}$ S-SCH correlator 215. Though not shown, S-SCH correlators are provided to correlate the $2^{nd}$ to $16^{th}$ slots of the input frame to the $2^{nd}$ to $16^{th}$ synchronization codes and as many mixers as the $2^{nd}$ to $16^{th}$ correlators are provided to receive correlation values from them. This is represented in FIG. 5 by the " . . . " between the first and seventeenth S-SCH correlators 213, 215 and the " . . . " between the first and seventeenth mixers 517, 519. The mixers 517–519 mix the conjugate received from the conjugator 515 with the signals received from the $1^{st}$–$17^{th}$ S-SCH correlators 213–215, respectively. Then, the S-SCH correlation value storage 521 stores the signals received from the seventeenth mixers 517–519 in a 17×1 matrix representative of correlation values for one slot.

There will be given a description of the mixing operation in detail. Upon receipt of frame data slot-time synchronized in the first cell search step in the cell search apparatus, the channel estimator 513 first channel-estimates the S-SCH signal in the first slot of the input frame. The channel estimation signal is delayed by a channel estimation time and the delay 511 compensates for a time delay that occurred for the channel estimation. The delay 511 synchronizes the timing of the S-SCH correlation, after the compensated channel estimation signal fed to the S-SCH correlation unit 211. The $1^{st}$ to $17^{th}$ S-SCH correlators 213 to 215 correlate the first slot of the S-SCH signal to the $1^{st}$ to $17^{th}$ synchronization codes. The mixers 517 to 519 mix the correlation values received from the $1^{st}$ to $17^{th}$ S-SCH correlators 213 to 215 with the signal received from the conjugator 515. The S-SCH correlation value storage 521 stores the mixed values received from the seventeenth mixers 517 to 519. Then, the above procedure is repeatedly applied to the $2^{nd}$ to $16^{th}$ slots.

By the time the operation of the S-SCH correlators 213 to 215 for the first S-SCH slot is finished, the 17×1 correlation values of the first S-SCH slot are stored in the S-SCH correlation value storage 521. Then, the maximum correlation value detector 523 detects the maximum of the stored correlation values, that is, in slot units. The symbol detector 525 detects a synchronization code corresponding to the maximum correlation value received from the maximum correlation value detector 523 and outputs the detected synchronization code number as a symbol number to the estimated BS Group specific symbol storage 527. The estimated BS Group specific symbol storage 527 stores the symbol data as a symbol of a BS specific code. Here, if the symbol corresponds to the first synchronization code SC1, the symbol is 1. The maximum correlation value detection process is performed on the $1^{st}$ to $16^{th}$ slots, sequentially, thus giving 16 symbols of a BS group specific code. Upon completion of symbols detection and storage with respect to the successive 16 slots, a codeword representative of the BS group specific code is thus stored in the estimated BS Group specific symbol storage 527.

Meanwhile, the cyclic shifter 531 reads codewords from the comma free code table storage 221 and cyclically shifts the codewords in sequence. That is, the symbols of the first codeword are sequentially shifted and provided to a comparator 529. The comparator 529 compares the comma free code received from the cyclic shifter 531 with the codeword stored in the estimated BS Group specific symbol storage 527. If they are identical, an estimation value 1 is stored to S-SCH estimation value storage 533. If they are different, no estimation value is stored to S-SCH estimation value storage 533. While cyclically shifting the comma free code table 15 times in sequence, the comparator 529 compares the 16 slots of one frame with each of the 32 comma free codes in the comma free code table. Therefore, 32×16×16 comparisons are made for the detected codeword. By the time the 32×16×16 comparisons are over, the BS group determiner 535 searches for the maximum value (i, j) whose first index i corresponds to BS group specific code and the second index j determines frame synchronization, i.e. the beginning of next frame in (16−j)%16 slots within the S-SCH estimation value storage 533.

To detect the codewords of a BS group specific code in the conventional second cell search step, correlation values of an input frame in each of 16 slots are calculated in 17 auto-correlation functions upon receipt of a frame. Then, the 16×17 correlation values are compared with each cyclic shifted 32 comma free codes indicating 32 BS groups. Consequently, a total of 32×16×16 calculations are performed. But, the present invention is referencing 1×17 estimated BC group specific symbol. So, the present invention is more efficient than conventional invention which the 16×17 correlation values referenced But, since not detected correlation values but their estimation values are stored, the capacity of a memory which would be otherwise consumed for the detected correlation values is also saved in the present invention. As a result, the efficiency of resources is increased and product cost is decreased.

In addition, errors possibly caused by the predetermination of the BS group specific code are prevented by channel compensation through a P-SCH prior to detection of the BS group specific code and frame synchronization from an S-SCH signal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A cell search apparatus in a mobile communication system, comprising:

a base station group specific code predetermining unit for determining a base station group specific code from a synchronization channel signal in synchronization with slot time;

an operation unit for cyclically checking the minimum distance estimation value of the predetermined base station group specific codes with a base station group specific code table; and a base station group detecting unit for determining a base station group according to storage of an estimation value.

2. The cell search apparatus of claim 1, wherein the base station group specific code predetermining unit comprises:

a correlation unit for calculating correlation values of each slot of a frame received on the secondary synchronization channel with respect to secondary synchronization codes; and a symbol detector for detecting symbol of secondary synchronization code corresponding to maximum values of the correlation value as a symbol to the estimated base station group specific code, in each slot.

3. The cell search apparatus of claim 2, wherein the base station group specific code predetermining unit further comprises:

a channel estimator for channel-estimating the signal received on the primary synchronization channel;

a conjugator for conjugating channel-estimated values; and a mixer for mixing conjugated values with calculated correlation values.

4. The cell search apparatus of claim 2, wherein the base station group specific code predetermining unit further comprising:

an estimated base station group specific symbol storage for storing a chosen symbol by symbol detector;

wherein the base station specific group codes are comma free codes.

5. The cell search apparatus of claim 1, wherein the operation unit comprises:

a cyclic shifter for cyclically reading base station group specific codes from the base station specific code table in sequence; and a comparator for comparing the predetermined base station group specific symbol with each of cyclic shifted the base station group specific codes and determining symbols with minimum distances from the comparisons.

6. A cell searching method in a mobile communication system, comprising the steps of:

determining a base station group specific code from a synchronization channel signal in synchronization with slot time;

checking the minimum distance estimation value of the predetermined base station group specific codes from a base station group specific code table in succession; and determining a base station group according to storage of an estimation value.

7. The cell searching method of claim 6, wherein the base station group specific code determining step comprises the steps of:

calculating correlation values of each slot of a frame received on the secondary synchronization channel with respect to synchronization codes; and detecting symbol of secondary synchronization code corresponding to maximum values of the correlation value as a symbol to the estimated base station group specific code, in each slot.

8. The cell searching method of claim 7, wherein the base station group specific code determining step comprises the steps of:

choosing base station group specific symbol in each slot and storing the base station group symbol;

wherein the base station specific group codes are comma free codes.

9. The cell searching method of claim 8, wherein the operation step comprises the steps of:

cyclically reading base station group specific codes from the base station specific code table in sequence; and comparing the base station group specific symbol with each of the cyclic shifted base station group specific codes and determining symbols with minimum distances from the comparisons.

10. The cell searching method of claim 7, wherein the base station group specific code predetermining step further comprises the steps of;

channel-estimating the signal received on the primary synchronization channel;

conjugating channel-estimated values; and mixing conjugated values with calculated correlation values.

* * * * *